United States Patent
Sano et al.

(10) Patent No.: US 10,017,192 B2
(45) Date of Patent: Jul. 10, 2018

(54) RAILCAR COLLISION ENERGY ABSORBING DEVICE AND RAILCAR

(71) Applicant: KAWASAKI JUKOGYO KABUSHIKI KAISHA, Hyogo (JP)

(72) Inventors: Atsushi Sano, Kobe (JP); Naoaki Kawakami, Kobe (JP); Naohiro Yoshida, Kobe (JP); Shinichiro Hata, Kobe (JP); Seiichiro Yagi, Akashi (JP); Masayuki Tomizawa, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 250 days.

(21) Appl. No.: 14/903,182

(22) PCT Filed: Jul. 17, 2014

(86) PCT No.: PCT/JP2014/003810
§ 371 (c)(1),
(2) Date: Jan. 6, 2016

(87) PCT Pub. No.: WO2015/015747
PCT Pub. Date: Feb. 5, 2015

(65) Prior Publication Data
US 2016/0152247 A1    Jun. 2, 2016

(30) Foreign Application Priority Data
Jul. 31, 2013  (JP) .................................. 2013-159047

(51) Int. Cl.
*B61D 15/06* (2006.01)
*B61G 11/16* (2006.01)
(Continued)

(52) U.S. Cl.
CPC .............. *B61D 15/06* (2013.01); *B61F 19/04* (2013.01); *B61G 11/16* (2013.01); *F16F 7/12* (2013.01)

(58) Field of Classification Search
CPC ......... B61D 15/06; B61F 19/04; B61G 11/16; F16F 7/12; B60R 19/34; B60R 19/36; B60R 2019/262; B60R 2021/0004
(Continued)

(56) References Cited

U.S. PATENT DOCUMENTS 630,552 A * 8/1899 Nash ...................... B61D 15/06
                                                      105/392.5
2,508,347 A * 5/1950 Marsh ................... B61G 11/04
                                                      213/220

(Continued)

FOREIGN PATENT DOCUMENTS

CN    101070072 A    11/2007
CN    102211558 A    10/2011
(Continued)

OTHER PUBLICATIONS

International Preliminary Report on Patentability of the International Searching Authority; PCT/JP2014/003810 dated Feb. 2, 2016.
(Continued)

*Primary Examiner* — Mark T Le
(74) *Attorney, Agent, or Firm* — Studebaker & Brackett PC (57) ABSTRACT

A railcar collision energy absorbing device includes: an energy absorbing element crushed in collision; and a casing extending in a car longitudinal direction so as to accommodate the energy absorbing element. One end of the casing is supported by a main structure of a railcar. The casing is constituted by a plurality of tubular bodies whose overlap-
(Continued)

ping portions are coupled to each other. The casing telescopically contracts in the collision by breaking of a coupling portion between the tubular bodies.

10 Claims, 8 Drawing Sheets

(51) Int. Cl.
 *F16F 7/12* (2006.01)
 *B61F 19/04* (2006.01)
(58) Field of Classification Search
 USPC .............................................. 105/72.2, 392.5
 See application file for complete search history.

(56) References Cited

U.S. PATENT DOCUMENTS

| | | | | |
|---|---|---|---|---|
| 3,252,548 | A * | 5/1966 | Pajak | B64C 25/001 188/377 |
| 3,847,426 | A * | 11/1974 | McGettigan | B60R 19/34 188/376 |
| 3,899,047 | A | 8/1975 | Maeda et al. | |
| 4,116,337 | A * | 9/1978 | Backus | B65D 81/02 206/591 |
| 7,077,065 | B2 * | 7/2006 | Tremblay | B60B 11/02 105/72.2 |
| 7,766,403 | B2 * | 8/2010 | Alvarsson | B60R 19/56 293/133 |
| 9,260,069 | B2 * | 2/2016 | Okuda | F16F 7/12 |
| 2007/0261592 | A1 | 11/2007 | Mochida et al. | |

FOREIGN PATENT DOCUMENTS

| | | |
|---|---|---|
| CN | 202879515 U | 4/2013 |
| CS | 249323 B1 | 3/1987 |
| EP | 1247716 A1 | 10/2002 |
| JP | S49-000672 A | 1/1974 |
| JP | H07-006025 U | 1/1995 |
| JP | H07-145842 A | 6/1995 |
| JP | 2002-513894 A | 5/2002 |
| JP | U-3164256 | 10/2010 |
| JP | 2012-001044 A | 1/2012 |
| JP | 4943905 B | 5/2012 |

OTHER PUBLICATIONS

The First Office Action issued by the State Intellectual Property Office of the People's Republic of China dated Oct. 9, 2016, which corresponds to Chinese Patent Application No. 201480021740.1 and is related to U.S. Appl. No. 14/903,182; with English translation of Search Report.
Search Report issued by Taiwan Patent Office; which corresponds to TW 103125658 and corresponds to U.S. Appl. No. 14/903,182; with English language translation.
International Search Report—PCT/JP2014/003810 dated Oct. 21, 2014.
Written Opinion—PCT/JP2014/003810 dated Oct. 21, 2014.
An Office Action issued by the Chinese Patent Office dated Dec. 4, 2017, which corresponds to Chinese Patent Application No. 201480021740.1 and is related to U.S. Appl. No. 14/903,182.
An Office Action issued by the Chinese Patent Office dated Jun. 2, 2017, which corresponds to Chinese Patent Application No. 201480021740.1 and is related to U.S. Appl. No. 14/903,182.

* cited by examiner

RAILCAR COLLISION ENERGY ABSORBING DEVICE AND RAILCAR

TECHNICAL FIELD

The present invention relates to a railcar collision energy absorbing device and a railcar including the railcar collision energy absorbing device.

BACKGROUND ART

Collision energy absorbing devices have been used in railcars. For example, PTL 1 discloses a railcar collision energy absorbing device in which an energy absorbing element is covered with a cover member, the energy absorbing element being crushed in collision.

The cover member of the collision energy absorbing device disclosed in PTL 1 prevents a slight shock from being applied to the energy absorbing element. The cover member breaks in the collision to cause the energy absorbing element to function. Specifically, the cover member has a box shape which opens toward a supporting plate so as to cover the energy absorbing element from a tip end of the energy absorbing element, the energy absorbing element projecting from the supporting plate toward a front side. A slit extending in a leftward/rightward direction is provided at a center of a front wall of the cover member. Slits extending in a forward/rearward direction are provided on both respective side walls of the cover member. In the collision, the cover member breaks along the slits to be divided into upper and lower parts in a V shape toward the supporting plate.

CITATION LIST

Patent Literature

PTL 1: Japanese Patent No. 4943905

SUMMARY OF INVENTION

Technical Problem

The cover member of the collision energy absorbing device disclosed in PTL 1 has strength durable against the slight shock. Therefore, a certain amount of load is necessary to break the cover member. However, in the case of using the cover member having relatively high strength, an influence of the cover member on a load-stroke characteristic is large, and a design of how to absorb the collision energy is difficult. In addition, if the cover member itself breaks, electric wires around the cover member may break, or peripheral devices may be damaged. Therefore, a space needs to be secured around the collision energy absorbing device.

An object of the present invention is to provide a collision energy absorbing device which facilitates the design of how to absorb the collision energy and does not require the space around the collision energy absorbing device, and a railcar including the collision energy absorbing device.

Solution to Problem

To solve the above problems, a railcar collision energy absorbing device of the present invention includes: an energy absorbing element crushed in collision; and a casing extending in a car longitudinal direction so as to accommodate the energy absorbing element, the casing including one end supported by a main structure of a railcar, the casing being constituted by a plurality of tubular bodies, the casing being configured to telescopically contract in the collision by breaking of a coupling portion between the tubular bodies, and overlapping portions of the tubular bodies being coupled to each other.

According to the above configuration, the energy absorbing element can be caused to function only by breaking the coupling portion between the tubular bodies of the casing. Therefore, the design of how to absorb the collision energy is easy. Since the casing telescopically contracts by the break of the coupling portion between the tubular bodies, it is unnecessary to secure a space around the collision energy absorbing device. In addition, since the crushed energy absorbing element is held in the casing contracted telescopically, broken pieces of the energy absorbing element can be prevented from scattering.

A railcar of the present invention includes the above railcar collision energy absorbing device.

Advantageous Effects of Invention

The present invention can provide the collision energy absorbing device which facilitates the design of how to absorb the collision energy and does not require the space around the collision energy absorbing device.

DESCRIPTION OF EMBODIMENTS

First Embodiment

Figure 1A:
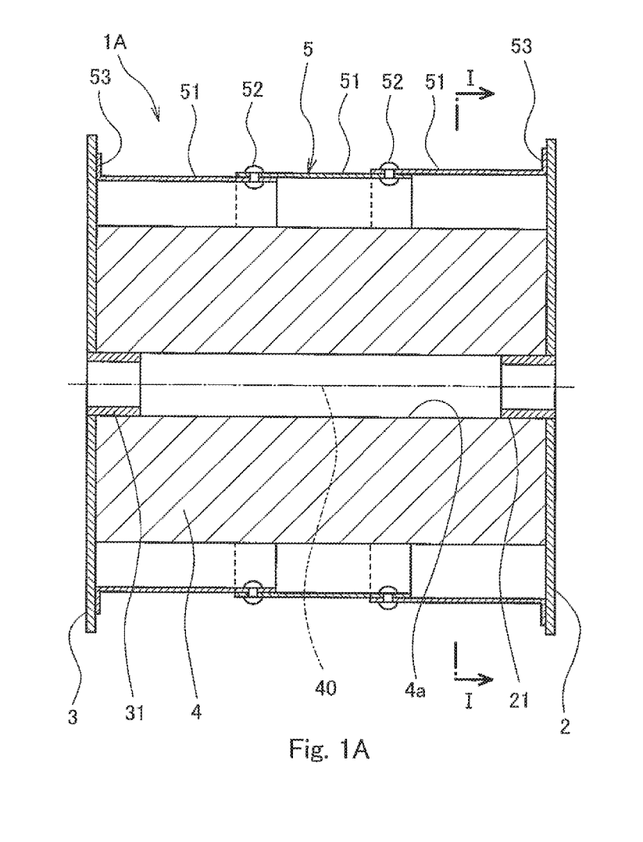
FIG. 1A is a longitudinal sectional view of a railcar collision energy absorbing device of a first embodiment.
Figure 1B:
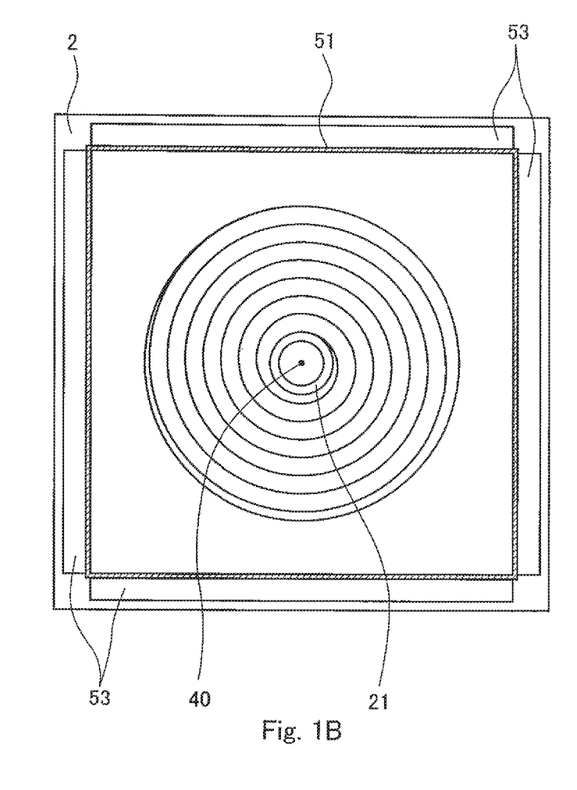
FIG. 1B is a cross sectional view taken along line I-I of FIG. 1A.
Figure 2A:
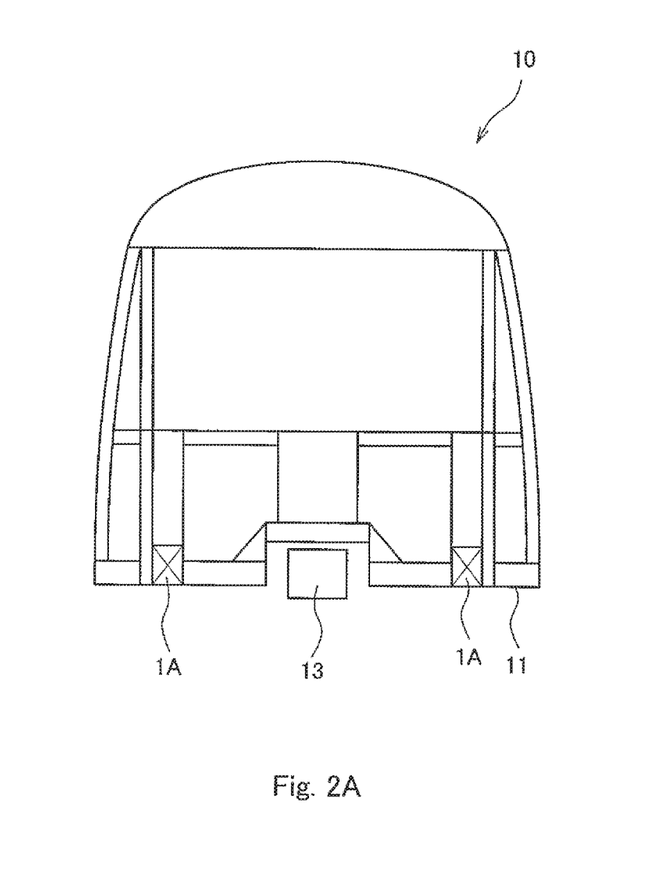
FIG. 2A is a front view of a railcar including the railcar collision energy absorbing device of the first embodiment.
Figure 2B:
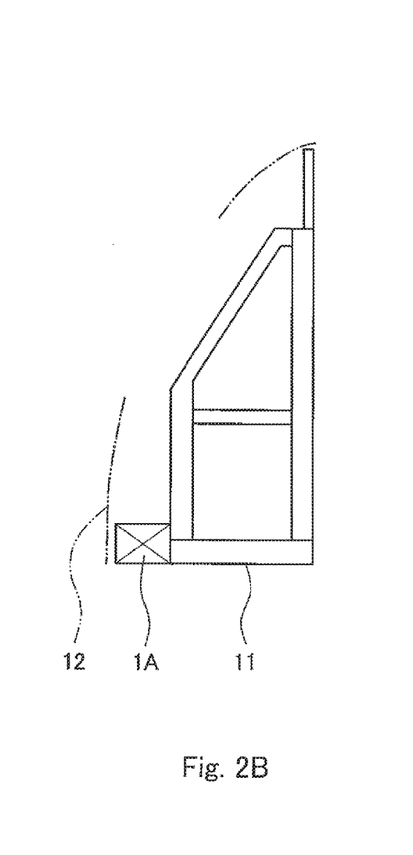
FIG. 2B is a side view of a head portion of the railcar.

FIGS. 1A and 1B show a railcar collision energy absorbing device 1A of the first embodiment, and FIGS. 2A and 2B show a railcar 10 including the collision energy absorbing device 1A.

The railcar 10 shown in FIGS. 2A and 2B is a head car. A pair of collision energy absorbing devices 1A are arranged at a lower portion of a front surface of a main structure 11 of the railcar 10 so as to be spaced apart from each other with a coupler 13 interposed between the collision energy absorbing devices 1A. More specifically, the main structure 11 includes an underframe, side bodyshells, end bodyshells, and a roof bodyshell, and the collision energy absorbing devices 1A project toward a front side (outer side in a car longitudinal direction) from both respective end portions of a front surface of the underframe. The collision energy absorbing device 1A may be covered with an exterior 12 of the railcar 10 or may project from the exterior 12.

Figure 6A:
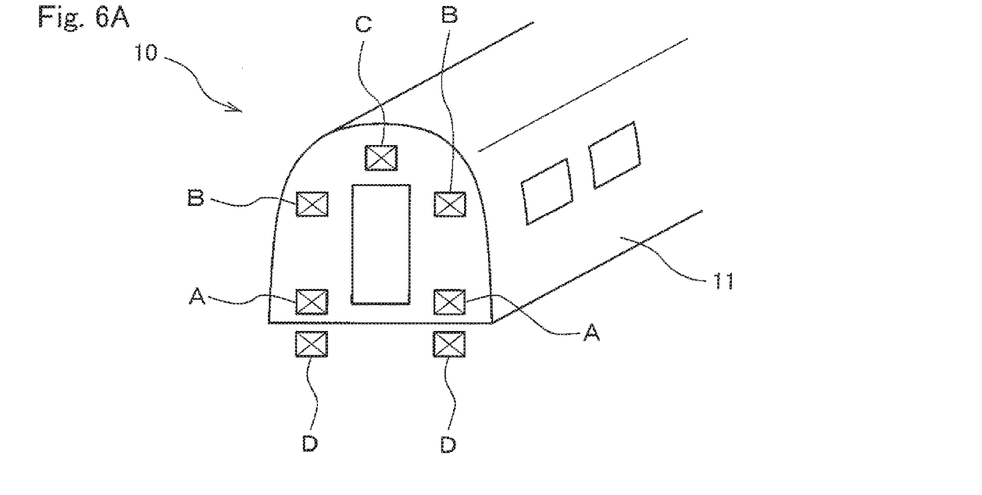
FIGS. 6A and 6B are diagrams each showing a modification example of a position of the collision energy absorbing device.

It should be noted that the railcar 10 including the collision energy absorbing devices 1A does not have to be the head car. For example, as shown in FIG. 6A, the railcar 10 including the collision energy absorbing devices 1A may be a middle car. In this case, two collision energy absorbing devices 1A may be arranged at both respective end portions of the front surface of the underframe (i.e., respective positions A shown in FIG. 6A). The collision energy absorbing devices 1A may be arranged such that: two collision energy absorbing devices 1A are located at both respective sides of an intermediate height position of the end bodyshell (i.e., respective positions B shown in FIG. 6A); one collision energy absorbing device 1A is located above a door provided at a center of the end bodyshell (i.e., a position C shown in FIG. 6A); and two collision energy absorbing devices 1A are located under both respective end portions of the underframe (i.e., respective positions D shown in FIG. 6A). In a case where the collision energy absorbing device 1A is arranged under the underframe, a described-below base plate 2 may be attached to the underframe through a bracket (not shown).

Figure 6B:
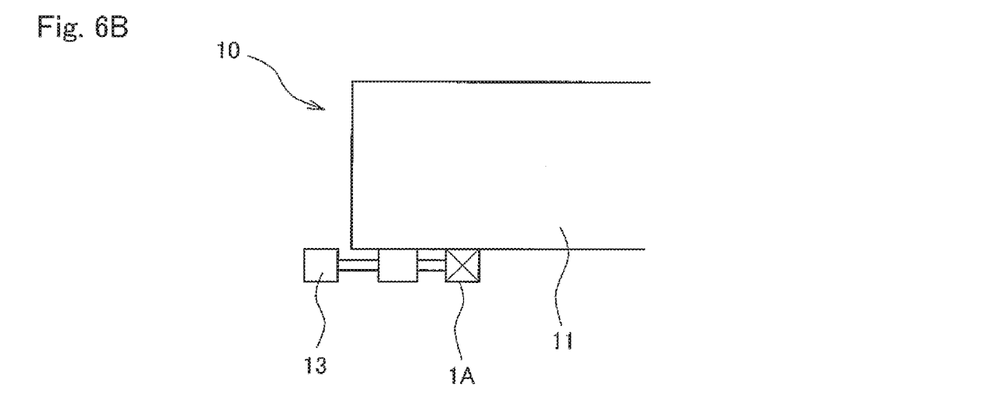

As shown in FIG. 6B, the collision energy absorbing device 1A may be arranged at a rear side (inner side in the car longitudinal direction) of the coupler 13 of the railcar 10 (The railcar 10 may be the head car or the middle car.). In this case, the below-described base plate 2 may be attached to the underframe through the bracket (not shown).

Referring again to FIGS. 1A and 1B, the collision energy absorbing device 1A includes: an energy absorbing element 4 crushed in the collision; and the base plate 2 and a top plate 3 which sandwich the energy absorbing element 4. The collision energy absorbing device 1A further includes a casing 5 provided between the base plate 2 and the top plate 3 to accommodate the energy absorbing element 4.

The base plate 2 is a plate which is attached to the main structure 11 of the railcar 10 and is flattened in a forward/rearward direction (car longitudinal direction). The top plate 3 is a plate which is flattened in the forward/rearward direction and opposes to the base plate 2 such that the top plate 3 and the base plate 2 sandwich the energy absorbing element 4. In the present embodiment, the base plate 2 has a rectangular shape, and the top plate 3 has a rectangular shape that is the same in size as the rectangular shape of the base plate 2. However, the size and shape of the base plate 2 may be different from the size and shape of the top plate 3. For example, one or both of the base plate 2 and the top plate 3 may have a circular shape or an oval shape.

The energy absorbing element 4 may have any structure as long as the energy absorbing element 4 can absorb collision energy by buckling. For example, the energy absorbing element 4 may be a tube made of carbon fiber reinforced plastic (CFRP). In the present embodiment, the energy absorbing element 4 is a roll member formed by rolling up a metal hollow sheet 45 shown in FIG. 3. Specifically, as shown in FIGS. 1A and 1B, the hollow sheet 45 is rolled up around a central axis 40 extending in the car longitudinal direction that is a direction connecting the top plate 3 and the base plate 2. To be specific, the energy absorbing element 4 has a columnar shape extending in the car longitudinal direction. However, in a case where a member other than the roll member is used as the energy absorbing element 4, the energy absorbing element 4 may be, for example, a polygonal column having a square cross section or an octagonal cross section or may be a cylinder, a cone, a pyramid, or the like. The energy absorbing element 4 may be a solid member made of foamed resin. In this case, various shapes are adoptable as the shape of the energy absorbing element 4 (for example, a cube).

Figure 3:
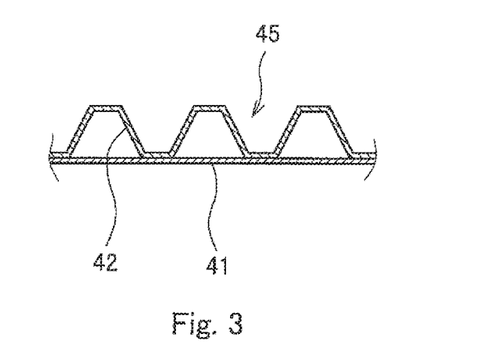
FIG. 3 is a diagram for explaining the configuration of a roll member.

The hollow sheet 45 has such a structure that a flat plate 41 and a corrugated plate 42 are stacked on each other. The flat plate 41 and the corrugated plate 42 are, for example, thin plates made of aluminum. A wave shape of the corrugated plate 42 may be a trapezoidal shape, a pulse shape, or a smooth curve shape.

The roll member that is the energy absorbing element 4 includes a through hole 4a which is located at a center of the roll member and extends in the forward/rearward direction (axial direction of the roll member). The top plate 3 is provided with a guide 31 fitted in the through hole 4a, and the base plate 2 is provided with a guide 21 fitted in the through hole 4a. In the present embodiment, the guide 31 is a pipe extending in the forward/rearward direction and is inserted into a hole of the top plate 3 and fixed to the top plate 3 by, for example, welding, and the guide 21 is a pipe extending in the forward/rearward direction and is inserted into a hole of the base plate 2 and fixed to the base plate 2 by, for example, welding.

It should be noted that the top plate 3 does not have to have the hole into which the guide 31 is inserted, and the base plate 2 does not have to have the hole into which the guide 21 is inserted. For example, each of the guides 21 and 31 may be a solid column. In this case, the guide 21 may be contacted to one of main surfaces of the base plate 2 and fixed to the base plate 2 by a bolt penetrating the base plate 2, and the guide 31 may be contacted to one of main surfaces of the top plate 3 and fixed to the top plate 3 by a bolt penetrating the top plate 3.

Further, in the present embodiment, both end surfaces of the roll member that is the energy absorbing element 4 are attached to the base plate 2 and the top plate 3 by an adhesive.

The casing 5 accommodating the energy absorbing element 4 extends in the forward/rearward direction, and both ends of the casing 5 are fixed to the base plate 2 and the top plate 3. To be specific, one end of the casing 5 is supported by the main structure 11 of the railcar 10 through the base plate 2.

More specifically, the casing 5 is constituted by a plurality of (three in the illustrated example) tubular bodies 51 each of whose axial direction corresponds to the forward/rearward direction. In the present embodiment, the cross-sectional shape of each tubular body 51 is a rectangular shape. However, the cross-sectional shape of each tubular body 51 may be a polygonal shape such as a hexagon or an octagon, or a circular shape.

In the present embodiment, the sizes of the tubular bodies 51 gradually increase toward the base plate 2 such that end portions of the adjacent tubular bodies 51 overlap each other. Then, these overlapping portions of the tubular bodies 51 are coupled to each other by rivets 52. However, contrary to the present embodiment, the sizes of the tubular bodies 51 may increase toward the top plate 3. The overlapping portions of the tubular bodies 51 do not have to be coupled to each other by the rivets 52 and may be coupled to each other by, for example, spot welding or bolts and nuts.

Each of the tubular bodies 51 located at both ends of the casing 5 includes a flange 53 and is fixed to the base plate 2 or the top plate 3 by the flange 53. The size of the smallest tubular body 51 fixed to the top plate 3 is set such that a space is secured between the smallest tubular body 51 and the energy absorbing element 4, the space being set so as to be able to accommodate the energy absorbing element 4 even if the energy absorbing element 4 is crushed by the collision to expand in a radial direction. It is desirable that a gap between the tubular bodies 51, a gap between the base plate 2 and the tubular body 51 located at one end, and a gap between the top plate 3 and the tubular body 51 located at the other end are sealed by sealing members for preventing intrusion of rain water.

Figure 4:
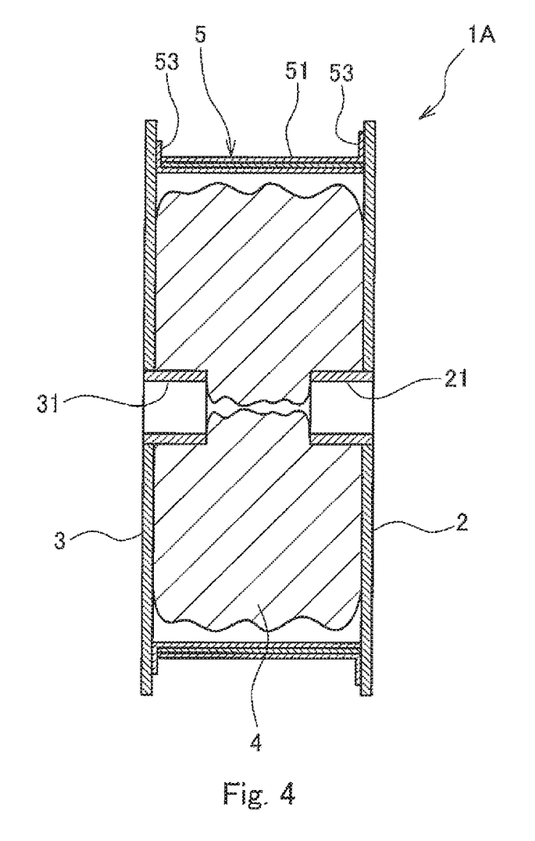
FIG. 4 is a longitudinal sectional view of the collision energy absorbing device deformed by collision.

Strength of the rivet 52 that is a coupling portion between the tubular bodies 51 is set such that the rivet 52 breaks in the collision of the railcar 10. Therefore, in the collision, the rivets 52 break, and the casing 5 telescopically contracts as shown in FIG. 4.

As above, in the present embodiment, the energy absorbing element 4 can be caused to function only by breaking the rivets 52 (coupling portions each between the tubular bodies 51). Therefore, the design of how to absorb the collision energy is easy. In other words, after the rivets 52 break, the collision energy can be absorbed mainly by the energy absorbing element 4. Since the casing 5 telescopically contracts by the break of the rivets 52, it is unnecessary to secure a space around the collision energy absorbing device 1A. In addition, since the crushed energy absorbing element 4 is held in the casing 5 contracted telescopically, broken pieces of the energy absorbing element 4 can be prevented from scattering.

Figure 5:
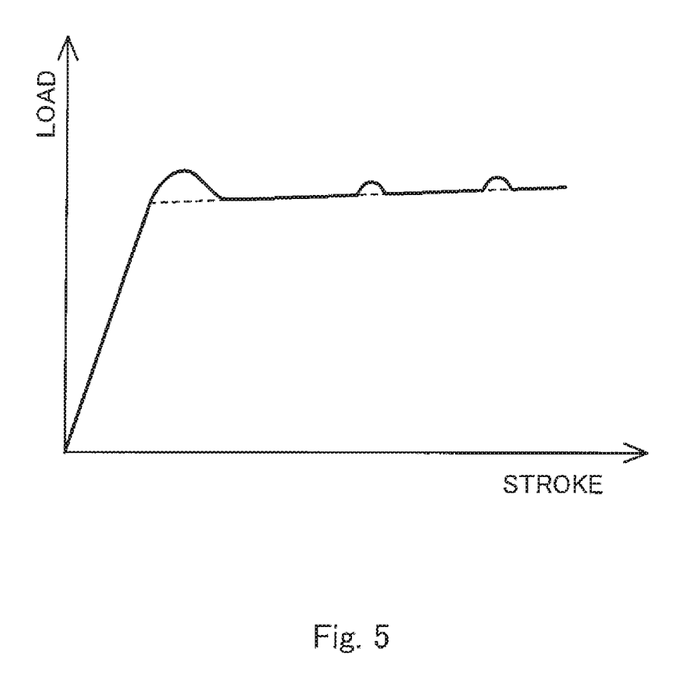
FIG. 5 is a graph showing a load-stroke characteristic of the railcar collision energy absorbing device of the first embodiment.

FIG. 5 is a graph showing a load-stroke characteristic of the collision energy absorbing device 1A of the present embodiment. In FIG. 5, the load-stroke characteristic of the energy absorbing element 4 is shown by a broken line.

In the present embodiment, since the energy absorbing element 4 is the roll member formed by rolling up the hollow sheet 45, the energy absorbing element 4 is crushed by a substantially constant load as shown by the broken line in FIG. 5. With this, it is possible to suppress a change in inertial force acting on occupants (passengers and crews), the change being caused by a change in deceleration in the collision.

In the present embodiment, the energy absorbing element 4 is crushed in advance by a predetermined amount. The "predetermined amount" may be slight and is, for example, not more than one tenth of a length of the energy absorbing element 4 before the crush (at the time of manufacture). If the energy absorbing element 4 is not crushed in advance, an initial load by which the energy absorbing element 4 starts being crushed in the collision becomes high. In contrast, in a case where the energy absorbing element 4 is crushed in advance as in the present embodiment, the initial load can be prevented from becoming high. Even in a case where the energy absorbing element 4 is not made of metal, effects obtained by crushing the energy absorbing element 4 in advance can be obtained similarly.

The energy absorbing element 4 crushed in advance looks bad and easily corrodes. However, since the energy absorbing element 4 crushed in advance is surrounded by the casing 5, the appearance can be improved, and the corrosion of the energy absorbing element 4 can be prevented.

Further, in the present embodiment, since the guides 21 and 31 fitted in the through hole 4a of the roll member that is the energy absorbing element 4 are provided at the base plate 2 and the top plate 3, respectively, the roll member can be held by the simple configuration.

In the present embodiment, since both end surfaces of the roll member are attached to the base plate 2 and the top plate 3 by the adhesive, the end surfaces of the roll member including a large number of openings can be easily fixed. In addition, since the energy absorbing element 4 is accommodated in the casing 5, the adhesive can be prevented from deteriorating. Even if adhesive force of the adhesive decreases, the energy absorbing element 4 can be kept on being sandwiched between the base plate 2 and the top plate 3 by the guide 21 of the base plate 2 and the guide 31 of the top plate 3. To be specific, a structure which excels in durability at the time of normal traveling can be realized.

Second Embodiment

Figure 7:
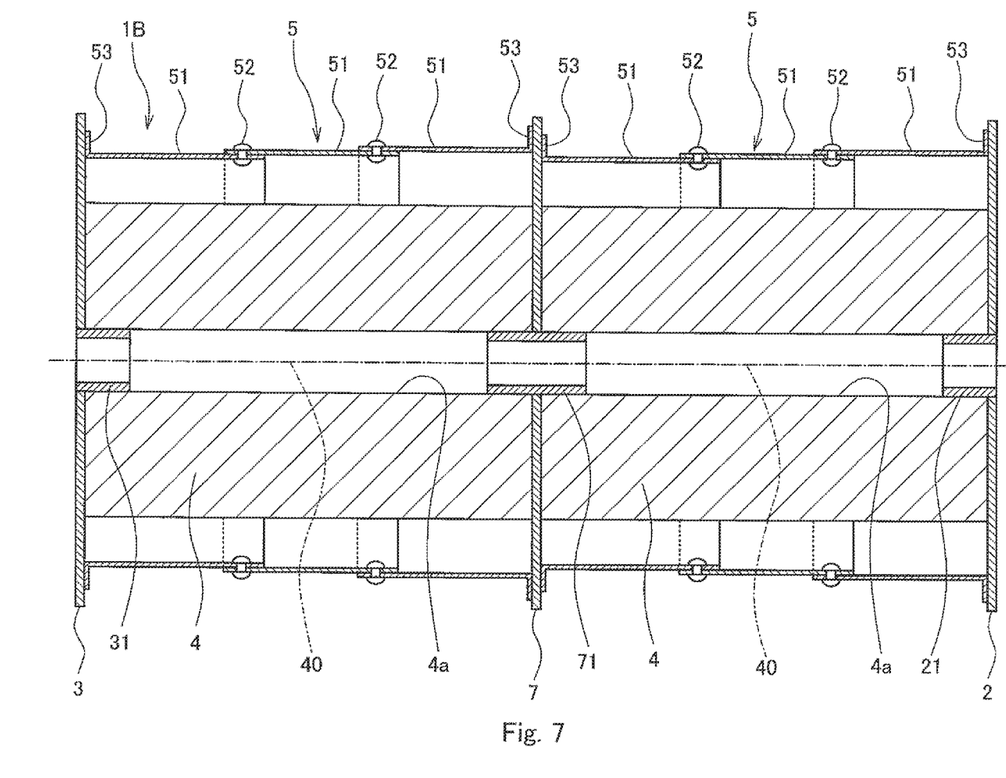
FIG. 7 is a longitudinal sectional view of the railcar collision energy absorbing device of a second embodiment.

Next, a railcar collision energy absorbing device 1B of the second embodiment will be explained in reference to FIG. 7. In the present embodiment and the third embodiment described below, the same reference signs are used for the same components as in the first embodiment, and a repetition of the same explanation is avoided.

In the present embodiment, two energy absorbing elements 4 are arranged between the base plate 2 and the top plate 3 so as to be lined up in the forward/rearward direction, and two casings 5 are arranged between the base plate 2 and the top plate 3 so as to be lined up in the forward/rearward direction. Specifically, an intermediate plate 7 is arranged between the base plate 2 and the top plate 3. The two energy absorbing elements 4 are sandwiched between the base plate 2 and the top plate 3 while sandwiching the intermediate plate 7. To be specific, the collision energy absorbing device 1B of the present embodiment is configured such that: the collision energy absorbing devices 1A of the first embodiment are lined up in the forward/rearward direction; and the intermediate plate 7 serves as both the base plate 2 for the collision energy absorbing device 1A located at a front side and the top plate 3 for the collision energy absorbing device 1B located at a rear side.

In the present embodiment, each of the energy absorbing elements 4 is the roll member including the through hole 4a located at the center of the roll member. The intermediate plate 7 is provided with a guide 71 fitted in the through holes 4a of the energy absorbing elements 4, the guide 71 penetrating the intermediate plate 7. A rear end surface of the energy absorbing element 4 located at the front side and a front end surface of the energy absorbing element 4 located at the rear side are attached to the intermediate plate 7 by the adhesive.

The present embodiment configured as above can obtain the same effects as the first embodiment. Further, according to the present embodiment, the energy absorbing elements 4 can be arranged in series by the simple configuration. With this, the present embodiment can absorb higher collision energy than conventional cases.

Third Embodiment

Figure 8A:
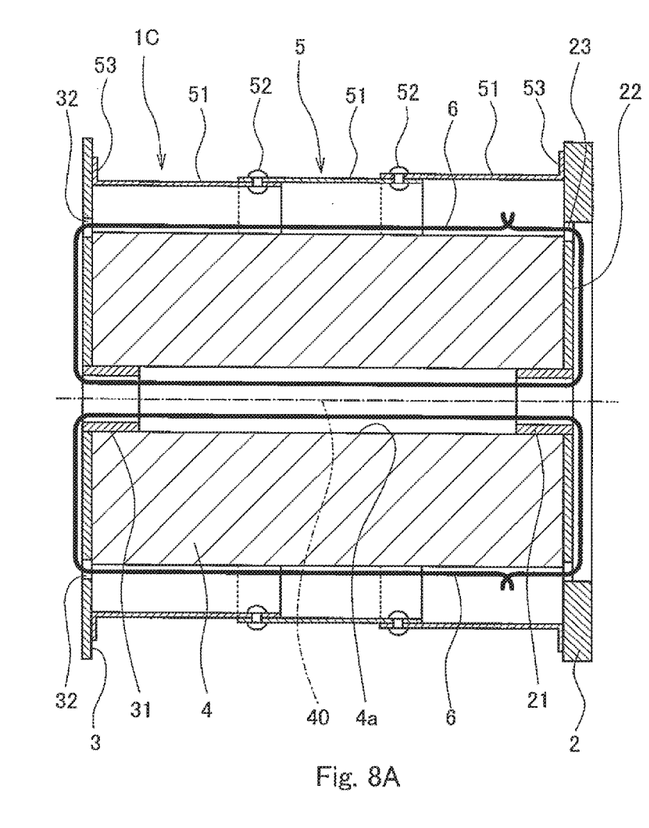
FIG. 8A is a longitudinal sectional view of the railcar collision energy absorbing device of a third embodiment.
Figure 8B:
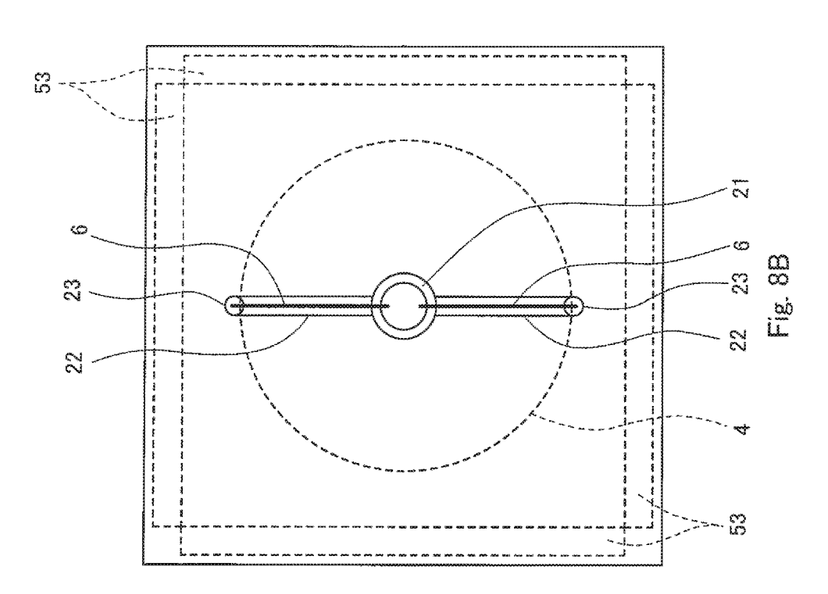
FIG. 8B is a rear view of the collision energy absorbing device.

Next, a railcar collision energy absorbing device 1C of the third embodiment will be explained in reference to FIGS. 8A and 8B. In the present embodiment, the energy absorbing element 4 is the roll member including the through hole 4a located at the center of the roll member. The energy absorbing element 4 is tied to the top plate 3 and the base plate 2 by wires 6 inserted into the through hole 4a.

In the present embodiment, two wire insertion holes 32 are formed on the top plate 3 at positions corresponding to an upper top portion and lower top portion of the energy absorbing element 4. Similarly, two wire insertion holes 23 are formed on the base plate 2 at positions corresponding to an upper top portion and lower top portion of the energy absorbing element 4. Further, each of two grooves 22 is formed on a rear main surface of the base plate 2 so as to extend from the hole, into which the guide 21 is inserted, to the wire insertion hole 23. Each of the wires 6 is routed through the wire insertion hole 23, the groove 22, an inside of the guide 21, the through hole 4*a*, an inside of the guide 31, and the wire insertion hole 32, and end portions of the wire 6 are tied to each other on an outer peripheral surface of the energy absorbing element 4.

However, a method of routing the wire 6 is not limited to this. One example may be such that: the wire insertion holes 23 and the grooves 22 are not formed on the base plate 2; one end of the wire 6 is joined to the guide 21; and the other end of the wire 6 is joined to the base plate 2 at a position outside the energy absorbing element 4. Another example may be such that a winding mechanism configured to wind the wire 6 is provided on the base plate 2.

The present embodiment configured as above can obtain the same effects as the first embodiment. In the present embodiment, since the energy absorbing element 4 is fixed by the wires 6, durability at the time of normal traveling can be made higher than a case where the adhesive is used.

Other Embodiments

The number of energy absorbing elements 4 accommodated in the casing 5 does not have to be one and may be plural.

The casing 5 does not have to be constituted by three tubular bodies 51 and may be constituted by two tubular bodies 51. When the casing 5 is constituted by three or more tubular bodies 51, not less than two third of the entire length of the energy absorbing element 4 can be smoothly crushed.

Figure 9:
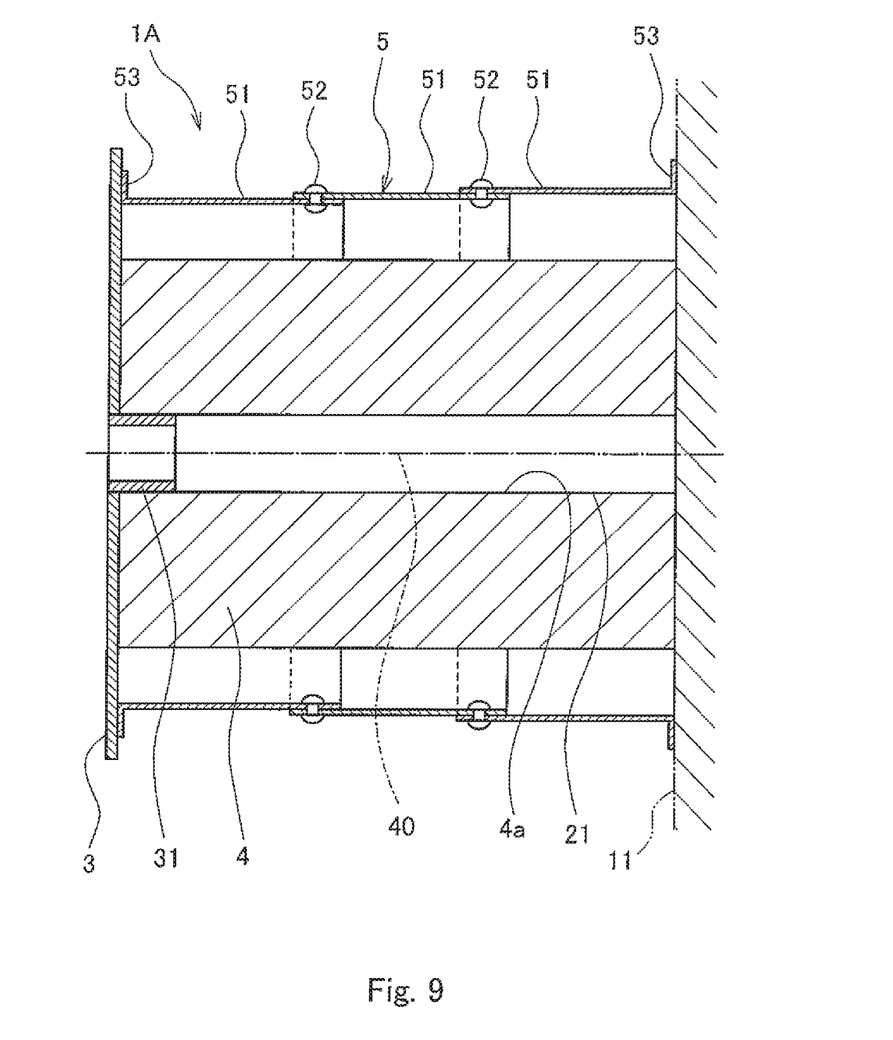
FIG. 9 is a longitudinal sectional view of the railcar collision energy absorbing device from which a base plate is omitted.

Further, the base plate 2 may be omitted. For example, as shown in FIG. 9, one end of the casing 5 may be directly fixed to the main structure 11 of the railcar 10.

INDUSTRIAL APPLICABILITY

The railcar collision energy absorbing device of the present invention is useful for various cars.

REFERENCE SIGNS LIST 1A to 1C collision energy absorbing device
10 railcar
11 main structure
2 base plate
21 guide
3 top plate
31 guide
4 energy absorbing element
4*a* through hole
40 central axis
41 flat plate
42 corrugated plate
45 hollow sheet
5 casing
51 tubular body
52 rivet (coupling portion)
6 wire

The invention claimed is:

1. A railcar collision energy absorbing device comprising:
an energy absorber crushed in collision; and
a casing extending in a car longitudinal direction so as to accommodate the energy absorber, the casing including one end supported by a main structure of a railcar, the casing being constituted by at least three tubular bodies having pairs of adjacent ends overlapping each other, and being fixed to each other by couplers at each of said pairs of adjacent ends, the casing being configured to telescopically contract in the collision by breaking of the couplers at each of said pair of adjacent ends, wherein
a gap is formed between the energy absorber and each of all of the plurality of tubular bodies, the at least three tubular bodies being made substantially the same length such that upon a full collapse of the energy absorbing device, before any deforming of the tubular bodies, both ends of each tubular body are in contact with respective transverse flat surfaces facing the ends of the each tubular body.

2. The railcar collision energy absorbing device according to claim 1, wherein the energy absorber is a roll member formed by rolling up a hollow sheet around a central axis extending in the car longitudinal direction, the hollow sheet being formed by stacking a flat plate and a corrugated plate on each other.

3. The railcar collision energy absorbing device according to claim 2, further comprising:
a base plate attached to the main structure of the railcar, the one end of the casing being fixed to the base plate; and
a top plate provided such that the energy absorber is sandwiched between the top plate and the base plate, wherein
both end surfaces of the roll member are attached to the base plate and the top plate by an adhesive.

4. The railcar collision energy absorbing device according to claim 2, further comprising:
a base plate which is attached to the main structure of the railcar and to which the one end of the casing is fixed; and
a top plate provided such that the energy absorber is sandwiched between the top plate and the base plate, wherein:
the roll member includes a through hole located at a center of the roll member;
the base plate includes a guide fitted in the through hole; and
the top plate includes a guide fitted in the through hole.

5. The railcar collision energy absorbing device according to claim 2, further comprising:
a base plate which is attached to the main structure of the railcar and to which the one end of the casing is fixed; and
a top plate provided such that the energy absorber is sandwiched between the top plate and the base plate, wherein:
the roll member includes a through hole located at a center of the roll member; and
the roll member is tied to the top plate and the base plate by a wire inserted into the through hole.

6. The railcar collision energy absorbing device according to claim 1, wherein the energy absorber is crushed in advance by a predetermined amount.

7. A railcar comprising the railcar collision energy absorbing device according to claim 1.

8. The railcar collision energy absorbing device according to claim 1, wherein the crushed energy absorber is held in the casing contracted telescopically.

9. The railcar collision energy absorbing device according to claim 1, wherein the coupler is positioned to overlap with the energy absorber when viewing the energy absorber in a direction perpendicular to a longitudinally extending central axis of the energy absorber.

10. The railcar collision energy absorbing device according to claim 1, wherein the top plate is in contact with or adjacent to the energy absorber.

\* \* \* \* \*